Dec. 17, 1957     E. S. WELCH, JR     2,816,596

DIELECTRIC HEAT SEALING METHOD AND APPARATUS

Filed Aug. 9, 1955

INVENTOR.
EDWARD SOHIER WELCH, JR.,

BY Emery, Booth, Townsend, Miller & Wiedner

United States Patent Office 2,816,596
Patented Dec. 17, 1957

2,816,596

DIELECTRIC HEAT SEALING METHOD AND APPARATUS

Edward Sohier Welch, Jr., Framingham, Mass., assignor to Fenwal Laboratories, Inc., Framingham, Mass., a corporation of Massachusetts Application August 9, 1955, Serial No. 527,271

13 Claims. (Cl. 154—42)

This invention relates generally to the manufacture of fluid handling equipment and apparatus and more particularly to uniting sheet and tube components of such apparatus and by dielectric heat sealing method and means. It has application primarily to apparatus and equipment such as embodying communicating fluid chambers and conduits and fabricated of polyvinyl and the like flexible plastic material bondable by dielectric heat.

The invention aims at the dual or simultaneous bonding of two or more seals of these chamber and conduit elements and components. The invention aims further at the uniform making of the multiple seals, and by safe and certain method and apparatus. More particularly the invention provides novel means for simultaneously energizing the dies and rods employed for clamping and heating the chamber and conduit forming sheets and tubes and so as to compensate for the spacing differences in and effect desired equal rate or uniform gradient bonding of the several seals.

The invention will be better understood from a consideration of the following specification taken in conjunction with the accompanying drawing in which.

Figure 2:
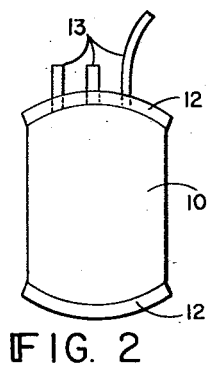
Fig. 2 is a side view of a plastic fluid handling equipment such as may be heat sealed by the apparatus of Fig. 1.

The handling and storage of fluids is advantageously accomplished with containing and conducting apparatus and equipment of flexible plastic construction. In medical, hospital, and surgical practice, for example, the heat sealing plastic sheeting and tubing here concerned is preferred for its light weight, flexibility, and disposability, and for its adaptability otherwise to fluid handling in accordance with sterile, medically accepted techniques. In Fig. 2 I show an an equipment representative of such practice and techniques and comprising a closed collapsible blood and also parenteral and intravenous solution container 10. This fluid container 10 is cut from a length of large diameter, thin walled, flexible plastic sleeving or tubing, and formed by the collapsing and sealing of the opposed, lay flat walls 11, 11, Fig. 3, of such large diameter tubing, as at the container ends 12, 12. The fluid storing and mixing container or bag 10 may be fitted for fluid collecting and dispensing by the integral fluid tight attaching or connecting, at one or both ends 12, 12 of one or more small diameter tubes 13. This closing of the bag ends at and by the bar seals 12, 12 is conventionally accomplished by compressing the opposed plastic sheet lengths or layers 11, 11 between a pair of dies or electrodes 14, 14, Fig. 3, which are insulated except for connection to the output of an appropriate high frequency generator 15. The electrodes 14, 14 are seen to be uniformly spaced, or arranged for parallel juxtaposition of their opposed faces, and the Fig. 3 apparatus to be one which uniformly heats and melts together the flatwise engaged sheets 11, 11.

It will be understood that at any point on the seal the rate of heating of the plastic layers is proportional to the voltage gradient ($e$), and that this gradient equals the total voltage ($E$) between the dies 14, 14 divided by the distance between the dies at the point chosen. At a point, for example, where the die spacing is $d_1$ the rate of heating will be proportional to a voltage gradient $e_1$, and the gradient will be found from $$e_1 = \frac{E}{d_1}$$

Figure 3:
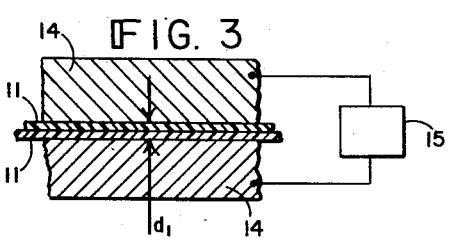
Fig. 3 shows a conventional apparatus for sealing sheet layers only.
Figure 4:
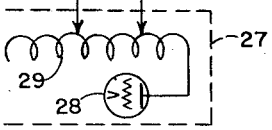
Fig. 4 shows the operation of a sheet-sheet bonding apparatus in a sheet-tube region of the bar seal.
Figure 4:
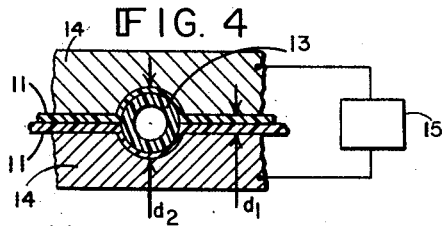

While the spacing and gradient values and hence the rate of heating may be uniform over the entire area of a sheet-sheet or Fig. 3 seal, it will be obvious that they are differentiated from those of the sheet-tube seal of Fig. 4, wherein is shown a bar seal portion characterized by the circumferential engagement of the sheets 11, 11 about and with an interfitted tube 13. More particularly, and because the dies 14, 14 are recessed to receive the inserted ends of the tubes 13 and also the divergent sheet portions surrounding the same, the spacing between the dies in the sheet-tube seal regions is greater, and therefore the rate of heating is slower, than that of the sheet-sheet seal area. Again, the heating rate is proportional to the voltage gradient, and the gradient $e_2$ through the tube 13 is equal to the total voltage E divided by the spacing $d_2$ thereat:

$$e_2 = \frac{E}{d_2}$$

As $d_2 > d_1$, $e_2 < e_1$. Accordingly and with the apparatus of Fig. 4, the bonding of the plastic layers in the regions of the inserted tubes 13 will require a longer application of the dielectric heat than will the melting together of the layers in the intervening lay-flat sheet regions.

From the foregoing it will be appreciated that to attempt with the apparatus of Fig. 4 the bonding of a bar seal such as here concerned and characterized by alternate regions of flatwise and circumferentially opposed layers would result either in incomplete sealing of the low gradient inserted-tube region or, and at least if the total voltage E were raised to effect even minimum bonding of the sheet-tube seal in overheating of the plastic in the high gradient region of the lay flat or sheet-sheet seal. This overheating will be understood to be as disadvantageous as the incomplete sealing, in that it leads to chemical deterioration of the plastic, and may be accompanied by dielectric breakdown such as resulting from excessive voltages.

Figure 5:
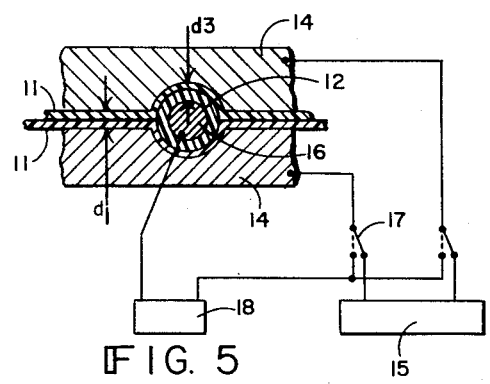
Fig. 5 illustrates a combination sheet-sheet and sheet-tube sealing apparatus as arranged and connected in accordance with the prior or conventional practice.

This difficulty has been met heretofore with the apparatus of Fig. 5 wherein a rod electrode 16 is inserted for enclosure by the plastic annulus comprising the tube 13 and the tube surrounding portions of the sheets 11, 11, and to have with respect to the recessed portions of the dies 14, 14 a radial or annular spacing $d_3$ which is uniform except at the points of juncture of said annulus with the continuously extending, tube intervening lay-flat sheet portions. Further to the Fig. 5 apparatus the electrodes 14, 14 are seen as connected through a double pole switch or relay 17, and in one position of the same to the poles of the generator 15. The dies 14, 14 are seen further, and in the other position of the relay 17 to have parallel connection to one pole of a second generator 18, the other pole of which is connected to the rod electrode 16.

In the operation of the Fig. 5 apparatus the generator 15 is energized with the relay 17 in the solid line position and the lay-flat, parallel, opposed portions of the sheets 11, 11 are bonded in what I have termed the sheet-sheet seal. The generator 15 is then turned off, the relay 17 thrown to the dotted line position, and the second generator 18 energized to bond the aforementioned annulus or sheet-tube seal. It will be appreciated that while the generator 18 heats the region of the rod 16 and uniformly across the spacing or annular distance $d_3$, because of the described common connection of the electrodes 14, 14 it cannot affect the region of the sheet-sheet seal. It follows that the generators 15, 18 can be severally chosen or separately controlled, as for example for extra heating of the lower gradient sheet-tube seal, whereby to effect a more uniform and higher quality bond of the plastic, and without overheating or dielectric breakdown at the higher gradient or sheet-sheet seal.

Those skilled in the art will appreciate that while the described technique might be carried out with but one generator, the more versatile or two-generator arrangement just described is preferred, particularly in view of the differing voltage and power requirements which may be applicable to the two sequential seals. For example, the sheet-sheet seals as made between the parallel opposed portions of the die electrodes may contain a many times greater length or volume than the rod or sheet-tube seals. Thus and as in the indicated example, it may be desirable to have the dies 14, 14 heated by a higher power, lower voltage generator and the rod 16 by a generator of low power, but producing a higher voltage gradient.

Those skilled in the art will appreciate still further that in practice, and notwithstanding the differing optimum generator characteristics as just described, a plurality of the tubes 13 may together be sealed to the container 10, as by connecting as many of the rods 16 in parallel, and in such case by designing the two generators 15, 18 to deliver about the same amount of power.

However, the conventional bag-tube sealing method and apparatus, just described, is disadvantageous in several important respects. The operation is slow and tedious, as the total required sealing time is the sum of the sealing times of the individual, successive, die and rod seals. Also, the indicated alternate or sequential sealing permits the cooling of one seal while another is being heated, and thus prevents the desired uniform simultaneous compression and fusing of all the plastic layer portions. Finally, the prior apparatus is seen to require, in the described relay or switch, a potential source of high contact resistance, and therefore of unreliable operation of the sealer.

The foregoing difficulties and disadvantages are avoided and overcome by the present invention, whereby faster and also more uniform and reliable sealing is provided. The invention provides more particularly new and improved method and means for making the sheet-sheet and sheet-tube seals simultaneously, and without the use of switching apparatus. My novel bag-tube sealing means will be seen further and in the present embodiment to employ dual generators connected respectively to said dies and to said rod and the dies, and whereby simultaneously to impress on said dies and said rod and dies desired voltages, and to generate across said seals alternating electric fields of different frequencies. More particularly I provide dual alternating current producing means constructed and arranged for common but non-interferent connection to the die electrodes, and selected and controlled to produce voltages calculated with respect to the spacing of the sheets and tubes to effect uniform gradient heating of the multiple seals and thereby to assure sufficient heating of the lower gradient seals while preventing chemical deterioration of the higher gradient seals.

Figure 1:
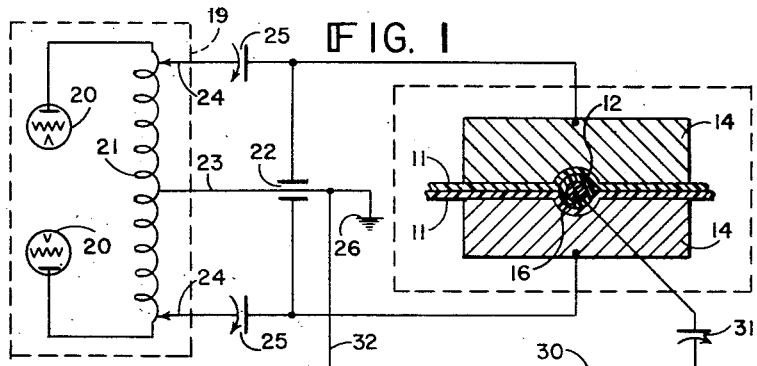
Fig. 1 is a schematic view of the invention apparatus for bonding both flatwise opposed sheet-sheet layers and circumferentially opposed sheet-tube layers of a bar seal.

A representative apparatus of the invention is illustrated in Fig. 1, and there shown to comprise a sealing die and rod assembly like that of Fig. 4 and including the dies 14, 14 for clamping together the bag walls 11, 11 and the rod 16 for inserting in the tube 13 interposed therebetween.

For bonding the sheet-sheet seal between the dies 14 and simultaneously and uniformly therewith the lower gradient sheet-tube seal between the rod 16 and dies 14 I provide a radio frequency generator 19 conveniently of the push-pull type and such as supplied by the vacuum tubes 20. The generator 19 is seen to provide a tank circuit characterized by the inductance 21 and the capacitor 22 having a tap 23, and also by the leads 24 to and for generating an alternating electric field between the dies 14, 14. The alternating current circuit includes also the variable capacitors 25 for adjusting the impedance of the load to comply with the output requirements of the tubes 20. Further to the first or die energizing circuit, the inductance 21 is center tapped at 23 and grounded as at 26 whereby the voltages applied to dies 14, 14 are 180° out of phase when measured with respect to ground, and are of magnitudes determined by the positions of the taps 24 and the settings of capacitors 25. In accordance with the invention, and to the ends more fully appearing hereinafter, capacitor 22, while providing a high impedance to and minimal shunting effect across the low frequency output of the generator 19, is given such magnitude as provides a low impedance path for a current of a different and herein much higher frequency, as may be applied to the tap 23 thereof. It will be understood that while said tap is usually at the mid capacity point of the capacitor, it may be adjusted to either side of center to compensate for irregularities in the sheet-tube seal such as caused by stray electrical effects or mechanical asymmetries.

As thus far described, the Fig. 1 apparatus will be understood to subject the bar seal to an alternating electric field and more particularly to energize the dies 14, 14 at potentials effective in the sheet-sheet seal regions to heat sufficiently and bond the plastic layers opposed and clamped therebetween. However, and as earlier noted, the heating time and potential or voltage difference appropriate for the sheet-sheet seals will not be sufficient for the sheet-tube seals, in the region of which the dies are more widely spaced and at least by twice or double the thickness or layers of the plastic, as reflecting the extension of such seals about and at both sides of the interfitted rod 16. This rod 16 may be said to assume, as by electrostatic induction, a potential midway between that of the dies 14, from which it will be clear that the rate of heating of the double annular seals thereat, at least in the case of equal thickness tubing and sheeting, is but half that of the single lay-flat seals between the flatwise opposed die portions.

Further in accordance with the invention I provide means for conjointly generating in the plastic spacing the rod 16 and dies 14 a second alternating electric field whereby additionally to heat the annular layers thereat and thus simultaneously and uniformly the different gradient sheet-sheet and sheet-tube seals. Referring again to Fig. 1, a second radio frequency generator 27, which is conveniently of the single ended type, is shown also as supplied by the tube 28. The generator and more particularly the inductance 29 has one terminal 30 connected to the rod 16 through the capacitor 31. In accordance with the invention, and in view particularly of the wide band sensitivity of the work, or plastic sheet or tube layers, the frequency of the generator 27 will be understood to be harmonically unrelated to and in this case much higher than that of the first generator 19.

Further in accordance with the invention the other generator output terminal 32 is connected at the center tap 23, whereby, as earlier noted, the capacitor 22 functions as a low impedance path for the high frequency current of generator 27, and whereby the dies 14, 14 are energized thereby at a potential common with respect to, and lower than that of, the rod 16. Thus the generator 27 is connected commonly but non-interferently with the generator 19, and whereby to energize the rod 16 and dies 14 at desired potentials, and so as to impress on the sheet-tube seals an alternating electric field simultaneously with and without disturbance of the like energizing field produced by the first generator 19. Thus by the means and method of the invention different voltage gradients are conjointly established in, and as appropriate to the different spacing of, the different seals, and whereby all the fluid handling apparatus components are simultaneously and uniformly melted together in a desired integral continuous fluid tight bond.

It should here be noted that generator 19, while it may be of the push-pull type herein shown by way of example, may as readily be of the single ended type, provided only that the connection 32 from generator 27 is maintained at the appropriate potential point with respect to each of the electrodes 14, as by adjustment of the tap 23, and that the proper choice of a generator 19 ground point is made.

It will be readily appreciated that the invention comprehends, and that the described apparatus may without departing from its scope and spirit be adapted to the bonding of equipment wherein the parallel and annular or sheet-sheet and sheet-tube seals have varying spacing and volume characteristics and relationships. Similarly, the invention is not limited to the making of but one rod seal, nor to the sealing of round tubes. Accordingly, and as used generally herein, the "tube" will be understood to embrace fluid conduits in any number and of every desired shape and thickness.

Figure 6:
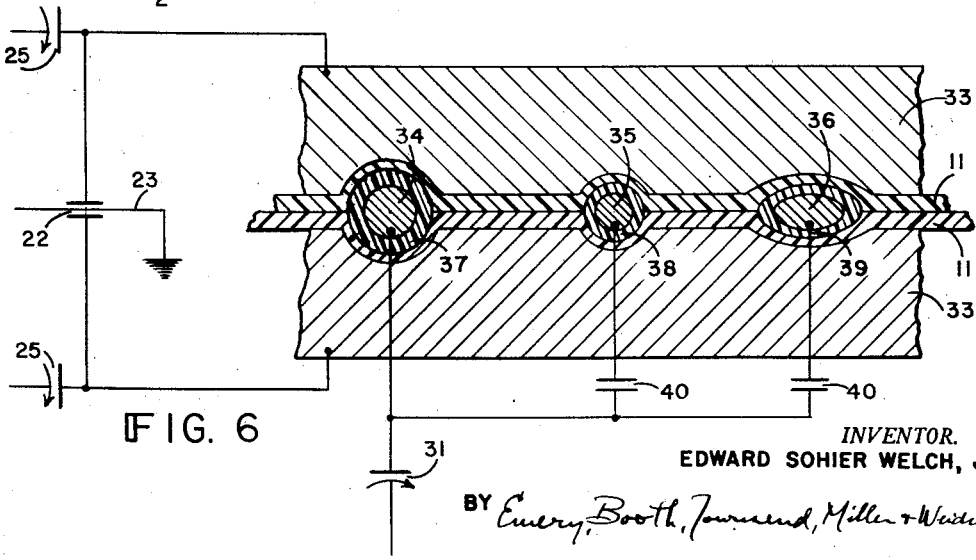
Fig. 6 illustrates the simultaneous making of sheet-sheet and sheet-tube seals by the invention apparatus as modified for sheet-tube seals of varying gradient.

This universal nature and application of the invention is illustrated in Fig. 6, wherein I show a multiple sealing apparatus comprising a pair of dies 33, 33 for clamping the bag wall or similar sheets 11, 11 and a plurality of differentiated rods 34, 35, 36 for inserting in the like varying sheet engaged tubes 37, 38, 39. In the particular example, the tube 39 is seen as oval, and round tube 37 is seen to be of a larger diameter than round tube 38, and to have thicker walls than both round tube 38 and oval tube 39. Further to the Fig. 6 embodiment, the dies 33, 33 are connected through variable capacitors 25, 25 to a low frequency generator and rods 34, 35, 36 through variable capacitor 31 to a higher frequency generator, which latter will be understood to be connected also to the center tap 23 of capacitor 22, all similarly as with the apparatus of Fig. 1.

It will be appreciated that if the several rods 34, 35, 36 were commonly connected to the capacitor 31 the tubes 37, 38, 39 would be subjected to equal total voltages, and that in the case as herein of dissimilar tubes of varying shape and thickness, the voltage gradients across some tubes, herein the tubes 38, 39 would be greater than across others, herein the tube 37, with the result that the higher gradient tubes would be overheated before the lower gradient tubes reached a sufficient or bonding temperature.

In accordance with the invention, means are provided in the rod and die circuit for equalizing the voltage gradients between the several rods 34, 35, 36 and the dies 33, 33, whereby the varying sheet-tube seals may be uniformly bonded. More particularly, I provide a pair of capacitors 40, 40, for connecting in series with rods 35, 36 respectively and for reducing the voltages applied thereto. In the Fig. 6 form my invention is thus seen to equalize the voltage gradients of differing but commonly connected sheet-tube seals by modifying, herein reducing appropriately the total voltages applied to some of the seals and for gradient conformity with the other, herein the thickest or lowest gradient seal.

It should be noted that the invention method and apparatus for gradient equalizing, just described, is independent of the number of differing sheet-tube seals to be simultaneously made and that such number is limited only by the capacity of the generator.

It will be understood that my invention is not limited to the particular embodiments thereof illustrated or described herein, and I set forth its scope in my following claims.

I claim:

1. In an apparatus for heat sealing opposed sheets and one or more interfitted tubes by conducting dies clamping said sheets and conducting rods inserted in said tubes, means including a first radio frequency generator connected to said dies for producing a dielectric heating voltage gradient within said sheets, and means including a second radio frequency generator connected to said rods and commonly to said dies for simultaneously producing dielectric heating voltage gradients within said sheets and tubes, said voltage gradients being calculated to effect uniform bonding of said sheets and tubes.

2. An apparatus according to claim 1 wherein said generators produce alternating electric fields of harmonically unrelated frequencies between said dies and said rods and dies respectively.

3. In rod and die apparatus for dielectric heat sealing of flexible plastic bags and tubes by sheet-sheet seals of the die clamped bag walls and sheet-tube seals of the walls to the interfitted rod receiving tubes, a first alternating current circuit including a radio frequency generator connected to said dies and for inducing an electric field in said sheet-sheet seals, said generator energizing said dies at potentials calculated to bond said seals, and a second alternating current circuit including a radio frequency generator connected to said rods and commonly to said dies and inducing an electric field in said sheet-tube seals, said second circuit generator energizing said rods and dies at potentials calculated to bond said sheet-tube seals.

4. The apparatus of claim 3 wherein the second generator has common connection to said rods and the sheet-tube seals have varying spacing, and capacitors connected in series with said rods for equalizing the gradients in said sheet-tube seals.

5. The apparatus of claim 3 wherein the first circuit comprises a center tapped capacitor connected commonly to the dies and being of a magnitude providing a low impedance path for the current of the second circuit, and wherein the generator of the second circuit is connected to the center tap of said capacitor.

6. In rod and die apparatus for dielectric heat sealing of plastic bag and tube apparatus by sheet-sheet seals of the die clamped bag walls and sheet-tube seals of the walls to the interfitted rod receiving tubes, the combination of means including a radio frequency generator connected to said dies and a tapped capacitor commonly connected to the generator output, means for impressing voltages on the dies and an alternating electric field in said sheet-sheet seals, and means including a radio frequency generator connected to said rods and to the tap of said capacitor for impressing voltages on said rods and dies and an alternating electric field in said sheet-tube seals, said generators operating simultaneously at harmonically unrelated frequencies so as to produce equal voltage gradients in said seals.

7. In an apparatus for heat sealing juxtaposed plastic sheeting and interposed plastic tubing by electrode dies clamping said sheeting and electrode rods inserted in said tubing, in combination, a first alternating current producing circuit including a radio frequency generator connected to said dies and a tapped capacitor connected to the generator output and commonly with said dies, said generator operable to produce between said dies a voltage gradient calculated to bond said juxtaposed sheeting, and a second alternating current producing circuit including a radio frequency generator connected to said rods and to the tap of said capacitor and operable to produce between said rods and dies voltage gradients calculated to bond said sheeting uniformly to said interposed tubing.

8. The apparatus of claim 7 wherein the generators are characterized by harmonically unrelated frequencies, and the tapped capacitor is of a magnitude producing a low impedance path for the current of said second circuit.

9. In an apparatus for dielectric heating of juxtaposed plastic sheeting and interposed plastic tubing by electrode dies making sheet-sheet seals between the sheeting and by rods inserted in and with the dies making sheet-tube seals about the tubing, in combination, a first alternating current circuit including a radio frequency generator connected to said dies for producing a desired voltage gradient in said sheet-sheet seals, and a second alternating current circuit including a radio frequency generator connected commonly to said rods and dies for simultaneously producing a desired voltage gradient in said sheet-tube seals.

10. The apparatus of claim 9 wherein one side of said second generator is connected at the electrical mid point of said first circuit so as to impress on said dies voltages common with respect to those on said rods.

11. The apparatus of claim 10 wherein said generators operate at harmonically unrelated frequencies.

12. The method of simultaneously and uniformly sealing the juxtaposed die clamped sheets and the interfitted rod receiving tubes of fluid containing and conducting apparatus which comprises energizing the dies with a current producing a determined potential difference across and an alternating electric field in said juxtaposed sheets, and simultaneously energizing said rods and commonly said dies with currents producing determined potential differences across and alternating electric fields in said sheets and interfitted tubes, said fields being of harmonically unrelated frequencies, said voltages being calculated to produce uniform heating in said sheets and tubes.

13. The method of making a sheet-sheet seal and sheet-tube seals in heat bondable sheet and tube apparatus which comprises establishing a first heat producing alternating electric field and a determined voltage gradient in said sheet-sheet seal, and simultaneously establishing in said sheet-tube seals a second heat producing alternating electric field having a frequency harmonically unrelated to that of said first field, and voltage gradients calculated to bond said sheet-tube seals uniformly with the bonding of said sheet-sheet seals.

References Cited in the file of this patent

UNITED STATES PATENTS

| | | |
|---|---|---|
| 2,457,659 | Graham et al. | Dec. 28, 1948 |
| 2,545,328 | Wilson et al. | Mar. 13, 1951 |
| 2,563,098 | Brown | Aug. 7, 1951 |
| 2,705,993 | Mann et al. | Apr. 10, 1955 |
| 2,727,560 | Bradley | Dec. 20, 1955 |